US009326279B2

(12) United States Patent
Kishiyama (10) Patent No.: US 9,326,279 B2
(45) Date of Patent: Apr. 26, 2016

(54) RADIO BASE STATION APPARATUS, TERMINAL AND RADIO COMMUNICATION METHOD

(75) Inventor: Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 170 days.

(21) Appl. No.: 13/985,344

(22) PCT Filed: Feb. 17, 2012

(86) PCT No.: PCT/JP2012/053820
§ 371 (c)(1),
(2), (4) Date: Aug. 14, 2013

(87) PCT Pub. No.: WO2012/111807
PCT Pub. Date: Aug. 23, 2012

(65) Prior Publication Data
US 2013/0322393 A1    Dec. 5, 2013

(30) Foreign Application Priority Data

Feb. 18, 2011  (JP) ................................. 2011-033578

(51) Int. Cl.
| | | |
|---|---|---|
| H04W 4/00 | (2009.01) | |
| H04W 72/04 | (2009.01) | |
| H04L 5/00 | (2006.01) | |

(52) U.S. Cl.
CPC ........... *H04W 72/042* (2013.01); *H04L 5/0057* (2013.01); *H04L 5/0092* (2013.01)

(58) Field of Classification Search
CPC ............... H04L 1/0693; H04W 72/02; H04W 72/0446; H04B 7/0632; H04B 7/0626
See application file for complete search history.

(56) References Cited

U.S. PATENT DOCUMENTS

| | | | | |
|---|---|---|---|---|
| 8,358,585 | B2 | 1/2013 | Chung et al. | |
| 8,537,702 | B2 * | 9/2013 | Jen ................................. | 370/252 |
| 8,548,485 | B2 * | 10/2013 | Gheorghiu et al. ........ | 455/452.1 |
| 8,582,638 | B2 * | 11/2013 | Earnshaw et al. ............. | 375/240 |
| 8,706,129 | B2 * | 4/2014 | Wu ............................ | 455/452.1 |

(Continued)

FOREIGN PATENT DOCUMENTS

WO         2009/088225 A2       7/2009

OTHER PUBLICATIONS

Catt et al.; "Way Forward on downlink reference signals for LTE-A"; 3GPP TSG-RAN WG1 #56, R1-091066; Athens, Greece, Feb. 9-13, 2009 (2 pages).

(Continued)

*Primary Examiner* — Brian O'Connor
(74) *Attorney, Agent, or Firm* — Osha Liang LLP (57) ABSTRACT

The present invention is designed to provide a radio base station apparatus which can acquire CSI reports at appropriate times, and which can trigger CSI reports effectively. The radio base station apparatus of the present invention has: a PDCCH signal generating section (211) that generates a downlink allocation signal for receiving and decoding downlink transmission data, the downlink allocation signal including a report request bit for triggering reporting of channel information aperiodically; a transmission section that transmits a downlink signal including a downlink control channel where the downlink allocation signal is mapped; and a receiving section that receives an uplink signal which includes the reporting of channel information from a terminal triggered by the report request bit, via the uplink.

10 Claims, 10 Drawing Sheets

(56) References Cited

U.S. PATENT DOCUMENTS

| | | | |
|---|---|---|---|
| 8,743,801 B2* | 6/2014 | Englund et al. | 370/329 |
| 8,817,647 B2* | 8/2014 | Liao et al. | 370/252 |
| 2012/0208547 A1* | 8/2012 | Geirhofer et al. | 455/452.2 |
| 2013/0294352 A1* | 11/2013 | Park et al. | 370/328 |

OTHER PUBLICATIONS

International Search Report for corresponding International Application No. PCT/JP2012/053820 mailed Mar. 27, 2012 (2 pages).

HTC; "Triggering of Aperiodic CQI for DL CCs"; 3GPP TSG-RAN WG1 #63, R1-106122; Jacksonville, USA, Nov. 15-19, 2010 (4 pages).

Samsung; "CQI Reference Resource Timing for LTE-A"; 3GPP TSG RAN WG1 #63bis, R1-110089; Dublin, Ireland, Jan. 17-21, 2011 (5 pages).

Notification of Reasons for Rejection in Japanese Patent Application No. 2011-033578 dated Oct. 15, 2013 (7 pages).

* cited by examiner

DCI FORMAT 1

| ITEM | NUMBER OF BITS | NOTES |
|---|---|---|
| RESOURCE ALLOCATION HEADER | 1 | SHOWING RESOURCE ALLOCATION TYPE (TYPE 0, TYPE 1) |
| RESOURCE BLOCK ALLOCATION | DEPEND ON RELOCATION TYPE DEPEND ON RESOURCE ALLOCATION TYPE | SHOWING RESOURCE BLOCK ALLOCATED TO UE |
| MODULATION SCHEME, CODING SCHEME | 5 | SHOWING NUMBER OF ALLOCATED PHYSICAL RESOURCE BLOCKS AND TRANSFER BLOCK SIZE, WITH MODULATION SCHEME |
| NUMBER OF HARQ PROCESSES | 3 (TDD), 4 (FDD) | SHOWING HARQ PROCESS |
| NEW DATA INDICATOR | 1 | IDENTIFYING NEW TRANSMISSION OR RETRANSMISSION |
| REDUNDANCY VERSION | 2 | SHOWING REDUNDANCY VERSION USED FOR CODING |
| PUSCH TPC COMMAND | 2 | SHOWING NUMBER OF TPC BITS APPLICABLE TO PUSCH TRANSMISSION |
| DOWNLINK ALLOCATION SIGNAL INDEX | 2 | SHOWING NUMBER OF DOWNLINK SUBFRAMES FOR ACK/NACK |
| CSI REQUEST | 1 or 2 | SHOWING PRESENCE OR ABSENCE OF APERIODIC CSI REPORT TRIGGER |

RADIO BASE STATION APPARATUS, TERMINAL AND RADIO COMMUNICATION METHOD

TECHNICAL FIELD

The present invention relates to a radio base station apparatus, a terminal and a radio communication method that are applicable to a radio communication system such as a cellular system.

BACKGROUND ART

Presently, in the 3GPP (Third Generation Partnership Project), the standardization of LTE-advanced (hereinafter the LTE Release 10 specifications and the specifications of later versions will be collectively referred to as "LTE-A"), which is an evolved radio interface of the LTE (Long Term Evolution) Release 8 specifications (hereinafter referred to as "LTE" or "Rel. 8") is in progress. LTE-A is attempting to realize higher system performance than LTE while maintaining backward compatibility with LTE.

In LTE, in downward communication from a base station to a terminal, reference signals are transmitted from a transmitting apparatus (base station) to a receiving apparatus (terminal). The primary use of reference signals is quality measurement for channel estimation for demodulation, frequency scheduling and adaptive MCS (Modulation and Coding Scheme) control.

To realize further improvement, introduction of high-order MIMO (for example, eight transmitting antennas) and coordinated multiple-point transmission/reception (CoMP) in LTE-A is under study. Consequently, in LTE-A, introduction of the CSI-RS (Channel State Information-Reference Signal) as a downlink reference signal for measuring downlink channel quality has been determined.

A user terminal receives the CSI-RS, which a base station transmits via the downlink, and, using this CSI-RS, measures channel quality such as the CQI (Channel Quality Indicator), the PMI (Precoding Matrix Indicator), the RI (Rank Indicator) and so on. The user terminal generates a CSI report, which includes measured channel quality information, and transmits the CSI report to the base station via the uplink.

CITATION LIST

Non-Patent Literature

Non-Patent Literature 1: 3GPP TSG RAN WG1 #56, R1-091066, CATT, CMCC, Ericsson, Huawei, LGE, Motorola, Nokia, Nokia Siemens Networks, Nortel, Panasonic, Philips, Qualcomm Europe, Samsung, Texas Instruments, "Way forward on downlink reference signals for LTE-A", Feb. 9-13, 2009

SUMMARY OF INVENTION

Technical Problem

Now, channel quality information (CQI, PMI, RI) included in a CSI report carries a large amount of data, and, while transmitting CSI reports from a user terminal to a base station frequently is inefficient, there is also a problem that, if the cycle of transmitting CSI reports is made long, the base station is unable to acquire CSI reports when necessary.

The present invention has been made in view of the above, and it is therefore an object of the present invention to provide a radio base station apparatus, a terminal and a radio communication method whereby a base station is able to acquire CSI reports at appropriate times and trigger CSI reports efficiently.

Solution to Problem

A radio base station apparatus of the present invention has: a downlink control information generating section that generates a downlink allocation signal for receiving and decoding downlink transmission data, the downlink allocation signal including a report request bit for triggering reporting of channel information aperiodically; a transmission section that transmits a downlink signal including a downlink control channel where the downlink allocation signal is mapped; and a receiving section that receives an uplink signal including the reporting of channel information, from a terminal triggered by the report request bit, via an uplink. Also, a terminal of the present invention has: a receiving section that receives a downlink signal; a channel information generating section that generates channel information based on a reference signal for quality measurement, included in the received downlink signal; a downlink control channel demodulation section that demodulates a downlink control channel from the received downlink signal, and demodulates a downlink allocation signal including a report request bit for triggering reporting of channel information aperiodically; and a transmission section that transmits an uplink signal including the reporting of channel information triggered by the report request bit included in the demodulated downlink allocation signal.

Advantageous Effects of Invention

According to the present invention, it is possible to provide a radio base station apparatus, a terminal and a radio communication method whereby a base station is able to acquire CSI reports at appropriate times and trigger CSI reports efficiently.

DESCRIPTION OF EMBODIMENTS

A gist of the present invention is that a radio base station transmits a downlink allocation signal including a trigger bit for triggering a CSI report aperiodically by a downlink control channel, and a user terminal detects the CSI report triggering bit included in the downlink allocation signal and transmits a CSI report including CSI. By this means, a CSI report to be used to control the downlink shared data channel (PDSCH) is triggered using a downlink allocation signal, which is downlink shared data channel control information, so that it is possible to realize an efficient trigger operation and a base station is able to acquire CSI reports at appropriate times.

The present invention is applicable to the LTE/LTE-A system, which is one next generation mobile communication system. First, an overview of the LTE/LTE-A systems will be described. Note that, in the following descriptions, a fundamental frequency block will be described as a component carrier.

In the present system, an LTE-A system, which is the first communication system having the first system band that is formed with a plurality of component carriers and that is relatively wide, and an LTE system, which is a second communication system having a second system band that is relatively narrow (and that is formed with one component carrier here), coexist. In the LTE-A system, radio communication is carried out using a variable system bandwidth of maximum 100 MHz, and, in the LTE system, radio communication is carried out in a variable system bandwidth of maximum 20 MHz. The system band of the LTE-A system is at least one fundamental frequency block (component carrier: CC), where the system band of the LTE system is one unit. Coupling a plurality of fundamental frequency blocks into a wide band as one in this way is referred to as "carrier aggregation."

For radio access schemes, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, channel configurations in the LTE system will be described.

Downlink channel configurations will be described first. The downlink channels include a PDSCH (Physical Downlink Shared Channel), which is used by user terminals in a cell on a shared basis, as a downlink data channel, and downlink L1/L2 control channels (PDCCH, PCFICH, and PHICH), as downlink control channels. Transmission data and higher control information are transmitted by the PDSCH. Scheduling information of the PDSCH and the PUSCH is transmitted by the PDCCH (Physical Downlink Control Channel). The scheduling information to constitute the downlink control information for PDSCH demodulation is referred to as "downlink allocation signal" or "downlink scheduling allocation." When the radio base station triggers transmission of CSI reports aperiodically, the radio base station may include a CSI triggering bit in the downlink allocation signal. The scheduling information to constitute the downlink control information for PUSCH demodulation is referred to as "uplink grant signal" or "uplink scheduling grant." When the radio base station triggers transmission of CSI reports aperiodically, the radio base station may include a CSI triggering bit in an uplink grant signal. The CSI triggering bit of the uplink grant signal may use the CQI request field of DCI format 0/4, which is defined in LTE. The number of OFDM symbols where the PDCCH is allocated is transmitted by the PCFICH (Physical Control Format Indicator Channel). HARQ ACK/NACK in response to the PUSCH are transmitted by the PHICH (Physical Hybrid-ARQ Indicator Channel).

Uplink channel configurations will be described. The uplink channels include a PUSCH (Physical Uplink Shared Channel), which is used by user terminals in a cell on a shared basis as an uplink data channel, and a PUCCH (Physical Uplink Control Channel), which is an uplink control channel. By means of this PUSCH, transmission data and higher control information are transmitted. A CSI report that is triggered aperiodically by a downlink allocation signal (hereinafter referred to as "the first aperiodic CSI") is allocated to the radio resource reserved in advance for the first aperiodic CSI. The first aperiodic CSI radio resource is allocated to the PUCCH or the PUSCH. CSI reports that re transmitted periodically (hereinafter referred to as "periodic CSI") are allocated to a periodic CSI control channel. The periodic CSI control channel is included in the PUCCH. A CSI report that is triggered aperiodically by an uplink grant signal (hereinafter referred to as "second aperiodic CSI") is allocated to the PUSCH. Also, on the uplink, ACK/NACK and so on are transmitted via the PUCCH or the PDSCH.

Figure 1:
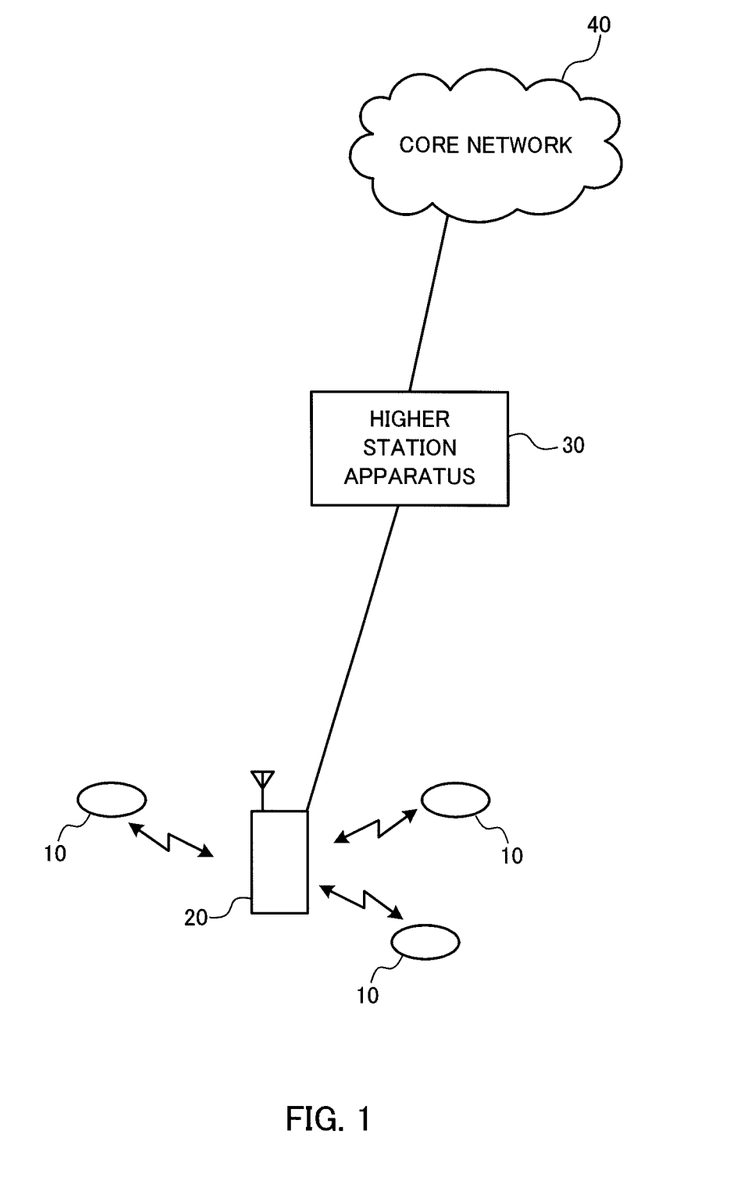
FIG. 1 is a schematic diagram to show an example of a configuration of a radio communication system according to the present embodiment.

Now, the radio communication system according to the present embodiment will be described in detail with reference to FIG. 1. Note that the radio communication system shown in FIG. 1 is a system to accommodate, for example, the LTE system or SUPER 3G. This radio communication system uses carrier aggregation, which makes a plurality of fundamental frequency blocks, in which the system band of the LTE system is one unit, as one. Also, this radio communication system may be referred to as "IMT-Advanced" or "4G."

The radio base station apparatus 20 is connected with a higher station apparatus 30, and this higher station apparatus 30 is connected with a core network 40. The channels are controlled such that a user terminal 10 under the radio base station apparatus 20 is able to communicate with the radio base station apparatus 20. Note that the higher station apparatus 30 includes, for example, an access gateway apparatus, a radio network controller (RNC), a mobility management entity (MME) and so on, but is by no means limited to these. The user terminal 10 (macro UE/micro UE) supports LTE/LTE-A, unless specified otherwise.

Figure 2:
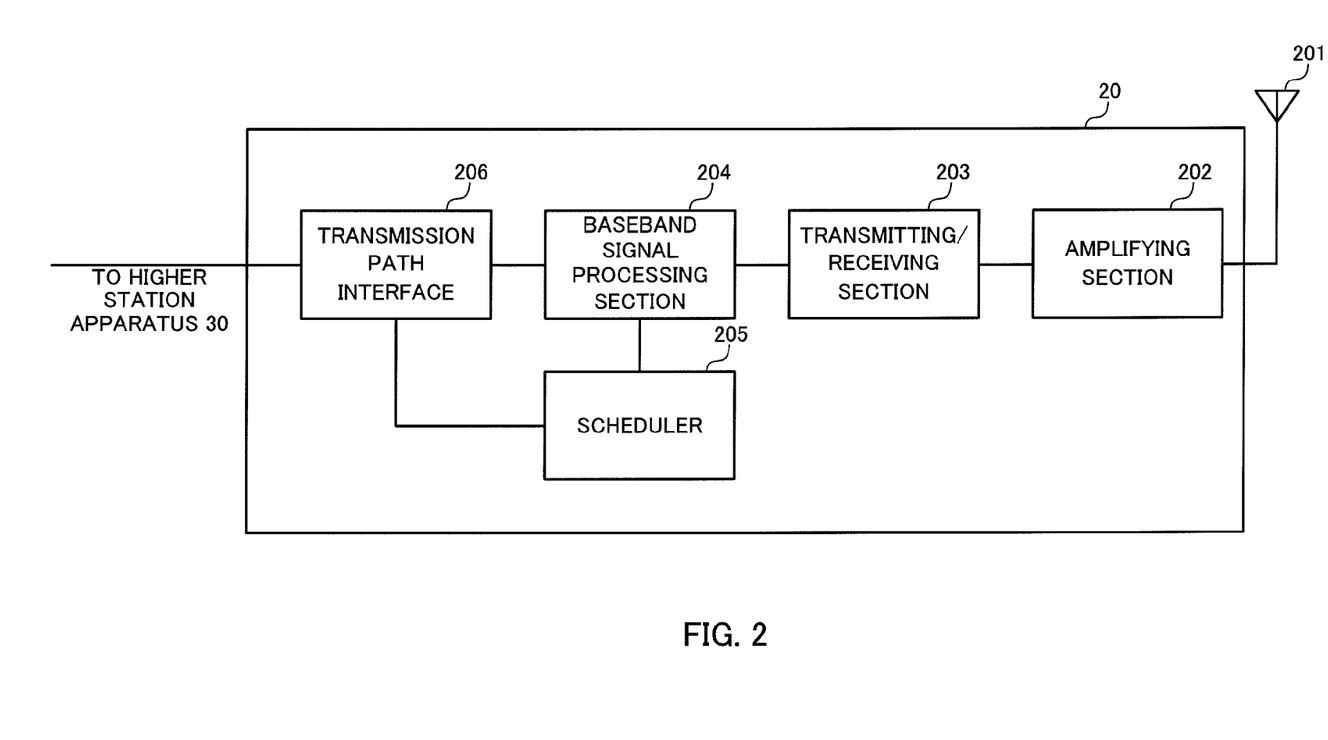
FIG. 2 is a schematic diagram to show an example of a configuration of a radio base station apparatus according to the present embodiment.

Now, referring to FIG. 2, an overall configuration of the radio base station apparatus 20 according to the present embodiment will be explained. The radio base station apparatus 20 has a transmitting/receiving antenna 201, an amplifying section 202, a transmitting/receiving section 203, a baseband signal processing section 204, a scheduler 205, and a transmission path interface 206. Transmission data to be transmitted from the radio base station apparatus 20 to the user terminal 10 is input from the higher station apparatus 30, into the baseband signal processing section 204, via the transmission path interface 206.

The baseband signal processing section 204 applies, to a downlink data channel signal, a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as for the signal of the physical downlink control channel, which is a downlink control channel, transmission processes such as channel coding and the inverse fast Fourier transform are performed.

Also, the baseband signal processing section 204 reports control information for allowing each user terminal 10 to perform radio communication with the radio base station apparatus 20, to the user terminals connected with the same cell, by a broadcast channel. Broadcast information for allowing radio communication includes, for example, the uplink or downlink system bandwidth, identification information of a root sequence (root sequence index) for generating random access preamble signals in the PRACH, and so on.

In the transmitting/receiving section 203, a baseband signal that is output from the baseband signal processing section 204 is subjected to frequency conversion into a radio frequency band. The amplifying section 202 amplifies the transmission signal having been subjected to frequency conversion, and outputs the result to the transmitting/receiving antenna 201.

Meanwhile, as for a signal to be transmitted on the uplink from the user terminal 10 to the radio base station apparatus 20, a radio frequency signal that is received in the transmitting/receiving antenna 201 is amplified in the amplifying section 202, subjected to frequency conversion and converted into a baseband signal in the transmitting/receiving section 203, and is input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signal is transferred to the higher station apparatus through the transmission path interface 206. Note that a call processing section is included as a functional element related to speech communication. The call processing section performs call processes such as setting up and releasing communication channels, manages the state of the radio base station apparatus 20 and manages the radio resources.

Now, detailed configurations of the baseband signal processing section 204 and the scheduler 205 of the radio base station apparatus 20 will be described with reference to FIG. 3.

The scheduler 205 determines the allocation of component carriers with respect to user terminals 10 under control, depending on the communication quality of the system band, and increases/decreases the component carriers to allocate to communication with the user terminals 10. Also, a propagation path in mobile communication varies differently per frequency, due to frequency selective fading. So, the scheduler 205 learns the channel state from the CQI, and periodic CSI/the first aperiodic CSI/second aperiodic CSI that are given as feedback from the user terminals having measured the downlink reference signals (the CRS, the CSI-RS and so on), and performs scheduling according to the channel state. So, upon user data transmission, adaptive frequency scheduling is executed by allocating resource blocks of good communication quality to the user terminals 10 on a per subframe basis. In adaptive frequency scheduling, a user terminal 10 of good propagation path quality is selected and allocated to each resource block. Consequently, the scheduler 205 allocates resource blocks, with which improvement of throughput is anticipated, using the CQI of each resource block, fed back from each user terminal 10. Also, the MCS (coding rate and modulation scheme) that fulfills a predetermined block error rate with the allocated resource blocks is determined. Parameters that satisfy the MCS (coding rate and modulation scheme) determined by the scheduler 205 are set in a PDCCH signal generating section 211, a PDSCH signal generating section 212, and a reference signal generating section 213.

The PDCCH signal generating section 211 generates downlink signals which include a downlink allocation signal for PDSCH demodulation and an uplink grant signal for PUSCH demodulation. In LTE/LTE-A, a downlink allocation signal for PDSCH demodulation is defined as DCI formats 1, 1A, 1B, 1C, 2, 2A and 2B. Also, an uplink grant signal for PUSCH demodulation is defined as DCI format 0/4. The PDCCH signal generating section 211 generates downlink control information (DCI). With the present embodiment, the first aperiodic CSI is triggered using a downlink allocation signal. Consequently, a report request bit for triggering the first aperiodic CSI is set in the DCI format (1, 2 and so on) for the downlink allocation signal. A field for setting the report request bit is added to the DCI format. The report request bit may be one bit or may be a plurality of bits.

Figure 4:
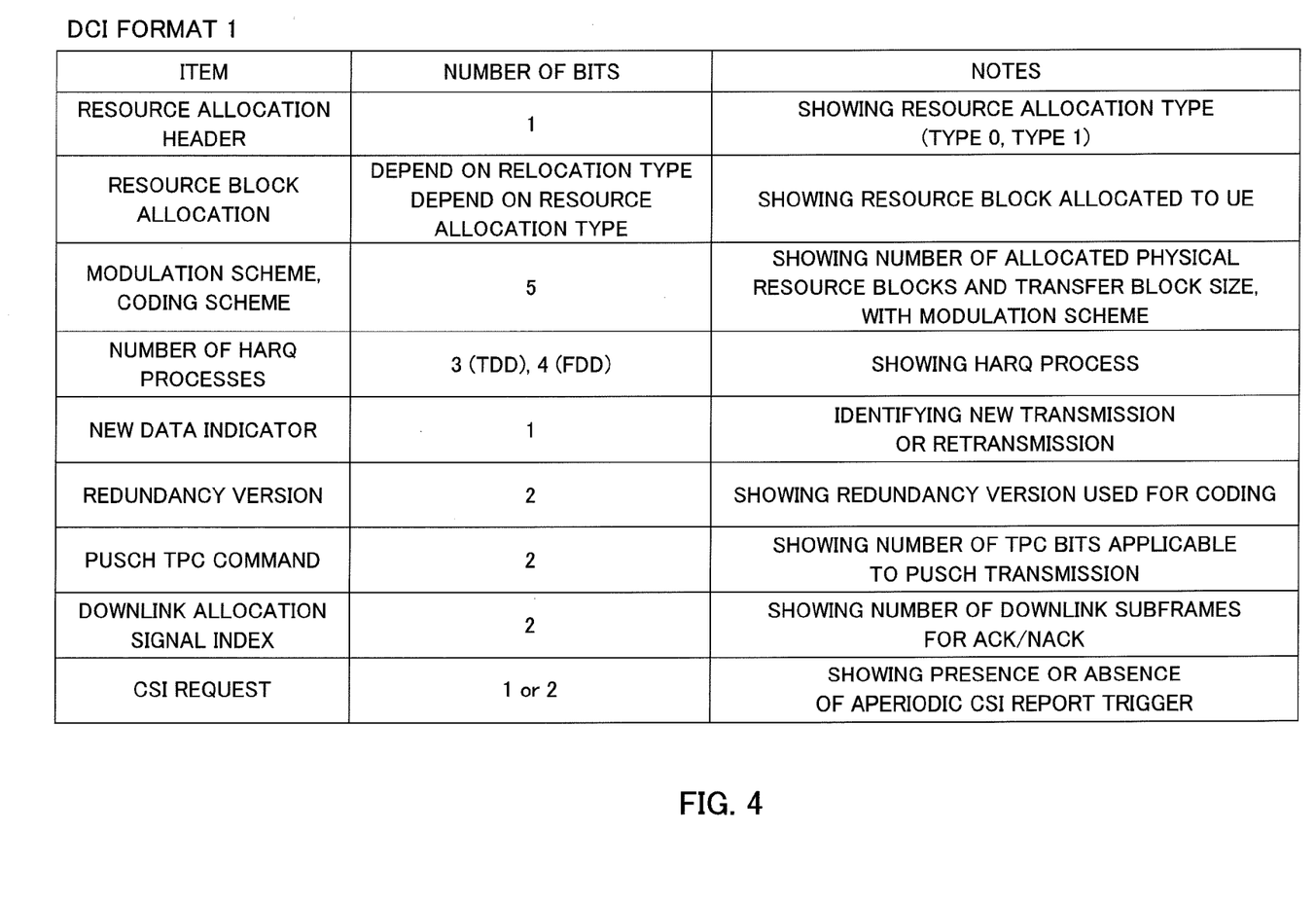
FIG. 4 is a table to show an example of a configuration of a downlink allocation signal (DCI format 1) according to the present embodiment.

FIG. 4 shown an example of a configuration of a downlink allocation signal (DCI format 1) where a report request bit is set. As shown in FIG. 4, in DCI format 1, a resource allocation header, the resource block allocation, the modulation scheme and coding scheme, the number of HARQ processes, a new data indicator, the redundancy version, the PUSCH TPC command, downlink allocation signal index, and so on are defined. In the CSI request field, a report request bit for the first aperiodic CSI trigger is set. When triggering the first aperiodic CSI, the CSI request field is enabled ("1"), and, when the first aperiodic CSI is not triggered, the CSI request field is disabled ("0").

Note that, although a configuration is shown here where the CSI request field, in which the report request bit is set, is added to DCI format 1, the present invention is by no means limited to this. The report request bit is not limited to one bit or two bits. Three bits or more multiple bits may be used as well.

The PDSCH signal generating section 212 generates data channel signals including transmission data and higher control information that are input from the higher station apparatus 30 via the transmission path interface 206. The higher control information may include radio resource allocation information for aperiodic CSI. The radio resource allocate information for aperiodic CSI is provided through higher layer signaling (for example, RRC signaling) by higher control information.

The reference signal generating section 213 generates downlink reference signals. In LTE/LTE-A, the CRS (Cell-specific Reference Signal), the DM-RS (Demodulation-Reference Signal), and the CSI-RS are defined as downlink reference signals. The CSI-RS is a reference signal to be used only to measure channel information (CQI, PMI, the number of ranks, etc.), and is multiplexed in the shared data channel (PUSCH). Compared to the CRS, the CSI-RS is transmitted in a long cycle (about once in a plurality of subframes).

The physical channel multiplexing section 214 maps the downlink data channel signal that is generated in the PDCCH signal generating section 211 and the downlink reference signal that is generated in the reference signal generating section 213, to radio resources, and performs physical channel multiplexing.

Figure 5:
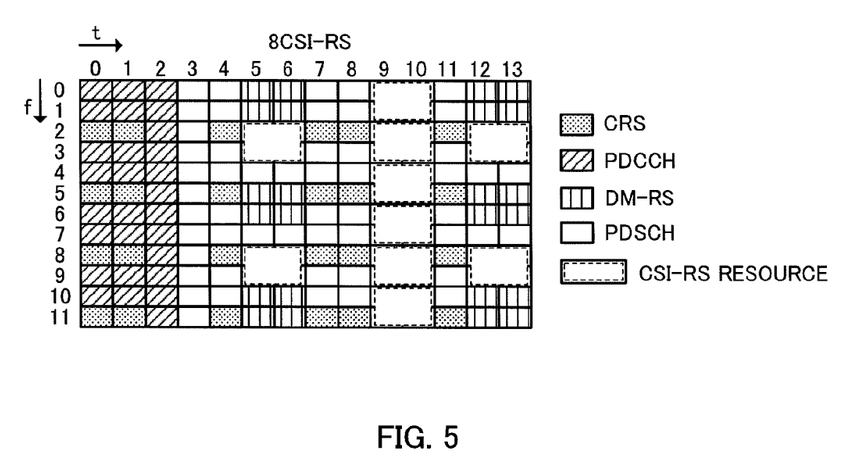
FIG. 5 is a diagram to show resource arrangement channel multiplexing.

FIG. 5 is a diagram to show the resource arrangement where channel multiplexing is performed on one resource block, in the physical channel multiplexing section 214. One resource block that is defined in LTE is formed with twelve subcarriers that are consecutive in the frequency direction and fourteen symbols that are consecutive in the time axis direction. As shown in FIG. 5, the CRS, the DM-RS, the CSI-RS, the PDCCH and the PDSCH are allocated to resource elements in one resource block. FIG. 5 shows a state where forty resource elements are secured as CSI-RS resources, and the CSI-RS is set to support the number of CSI-RS ports eight.

Figure 3:
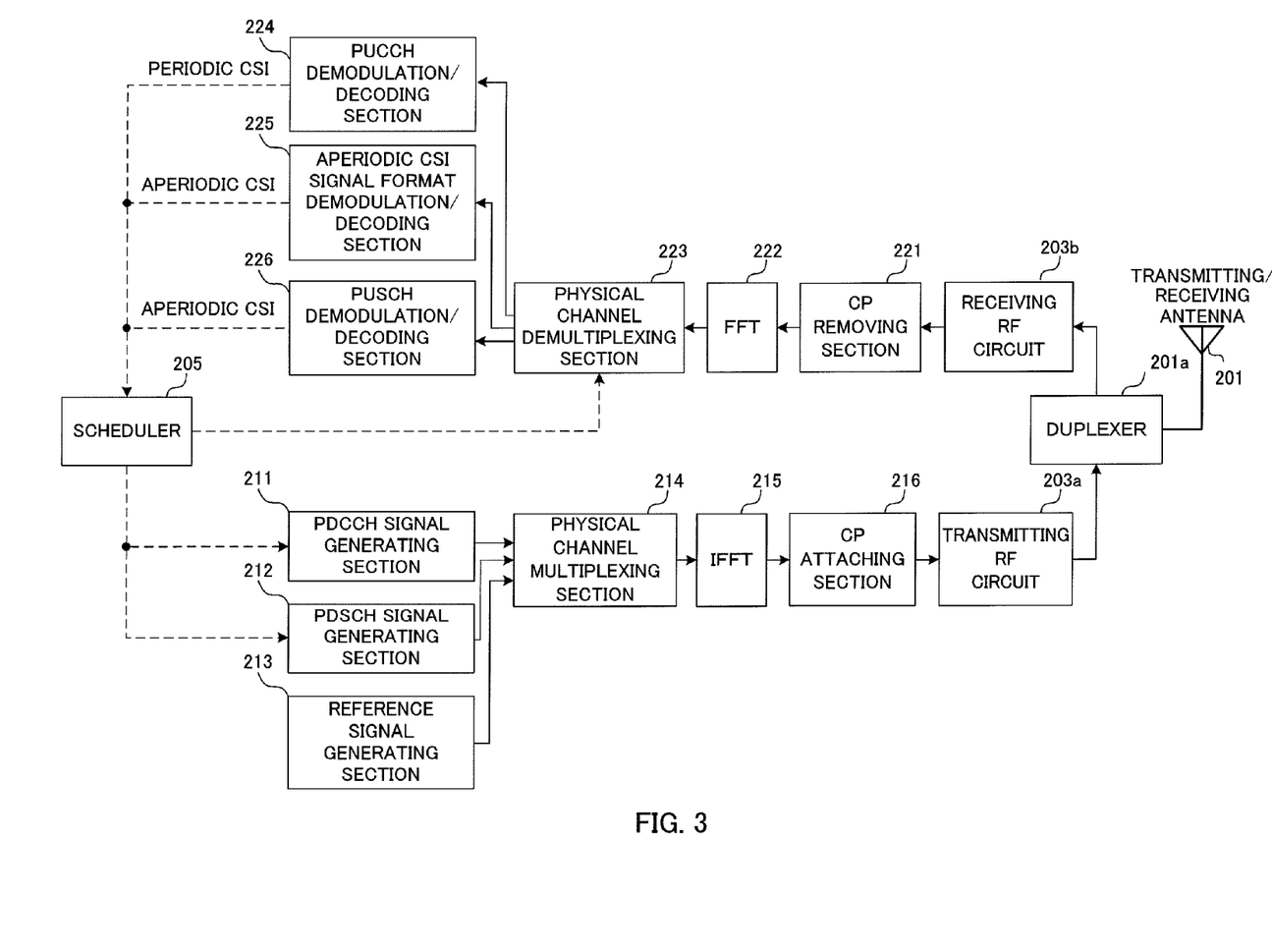
FIG. 3 is a schematic diagram to show an example of a detailed configuration of a radio base station apparatus according to the present embodiment.

A downlink signal that is multiplexed in the physical channel multiplexing section 214 is converted into a time domain signal in the inverse fast Fourier transform section 215, attached cyclic prefixes in the CP attaching section 216, and, after that, transmitted from the transmitting/receiving antenna 201 through a transmitting RF circuit 203a (which corresponds to the transmitting/receiving section 203 and the amplifying section 202 of FIG. 3) and a duplexer 201a. Note that a cyclic prefix functions as a guard interval for cancelling the differences in multipath propagation delay.

The radio base station apparatus 20 receives an uplink signal transmitted from the user terminal 10 in the transmitting/receiving antenna 201. The received uplink signal is subject to frequency conversion into a baseband signal in a receiving RF circuit 203b (which corresponds to the transmitting/receiving section 203 and the amplifying section 202 of FIG. 3). The uplink signal having been subjected to frequency conversion has the cyclic prefixes removed in a CP removing section 221, subjected to a Fourier transform and converted into a frequency domain signal in a fast Fourier transform section 222, and is input in a physical channel demultiplexing section 223.

The physical channel demultiplexing section 223 demultiplexes the received uplink signal using uplink resource allocation information given from the scheduler 205. In the example shown in FIG. 3, the received uplink signal is demultiplexed into the PUCCH, the PUSCH and periodic/aperiodic CSI feedback signals.

The PUCCH demodulation/decoding section 224 demodulates and decodes the uplink shared data channel (PUSCH). A periodic CSI report is demodulated and decoded in the PUCCH demodulation/decoding section 224. The aperiodic CSI signal format demodulation/decoding section 225 demodulates and decodes the first aperiodic CSI triggered by the report request bit of the downlink allocation signal and acquires the first aperiodic CSI report. The PUSCH demodulation/decoding section 226 demodulates and decodes the second aperiodic CSI, triggered by an uplink grant signal, and also demodulates and decodes uplink user data.

Figure 6:
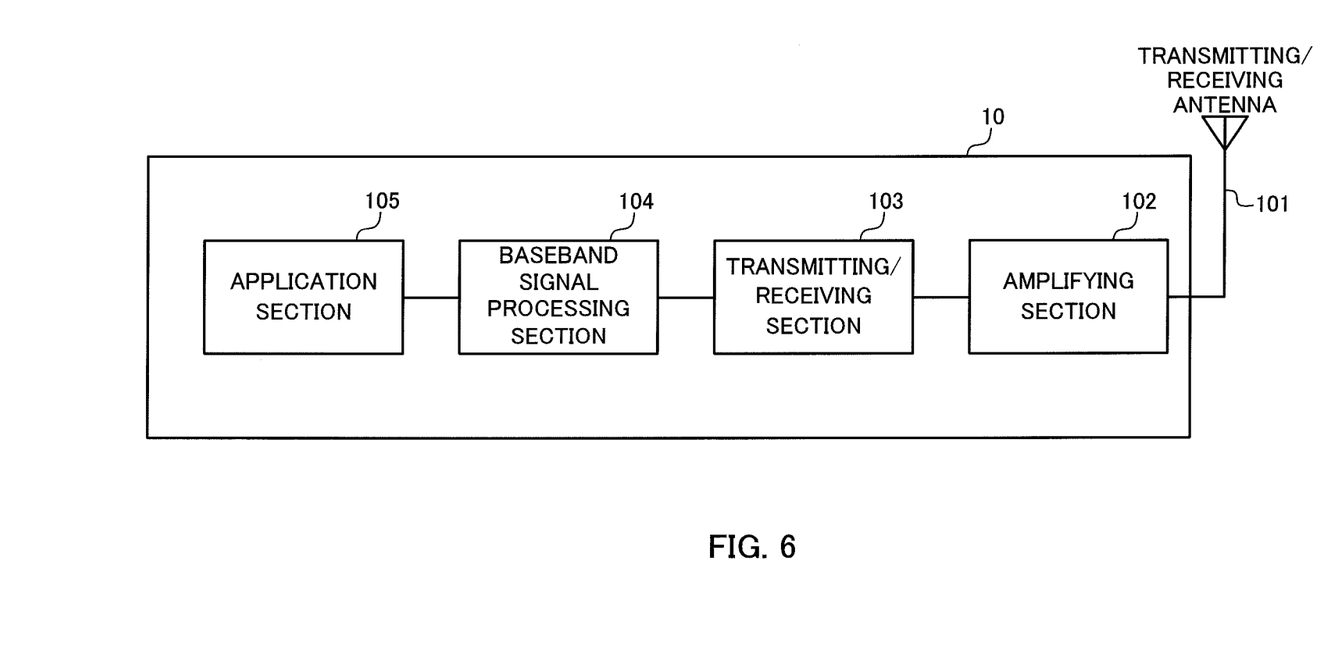
FIG. 6 is a schematic diagram to show an example of a configuration of a user terminal according to the present embodiment.

Next, referring to FIG. 6, an overall configuration of the user terminal 10 according to the present embodiment will be described. The user terminal 10 has a transmitting/receiving antenna 101, an amplifying section 102, a transmitting/receiving section 103, a baseband signal processing section 104, and an application section 105.

The amplifying section 102 amplifies the radio frequency signal received in the transmitting/receiving antenna 101, and sends the result to the transmitting/receiving section 103. The transmitting/receiving section 103 performs frequency conversion of the radio frequency signal into a baseband signal and outputs the result to the baseband signal process section 104.

The baseband signal processing section 104 performs receiving processes such as an FFT process, error correction decoding, and retransmission control. In downlink data, downlink transmission data (user data) is transferred to the application section 105. The application section 105 performs processes related to higher layers above the physical layer and the MAC layer. Also, in the downlink data, broadcast information is also transferred to the application section 105.

Meanwhile, uplink transmission data (user data) is input from the application section 105 to the baseband signal process section 104. The baseband signal processing section 104 performs a retransmission control (H-ARQ (Hybrid ARQ)) transmission process, channel coding, a DFT process, and an IFFT process. The baseband signal output from the baseband signal processing section 104 is converted into a radio frequency band in the transmitting/receiving section 103. Then, the result is amplified in the amplifying section 102 and transmitted from the transmitting/receiving antenna 101.

Figure 7:
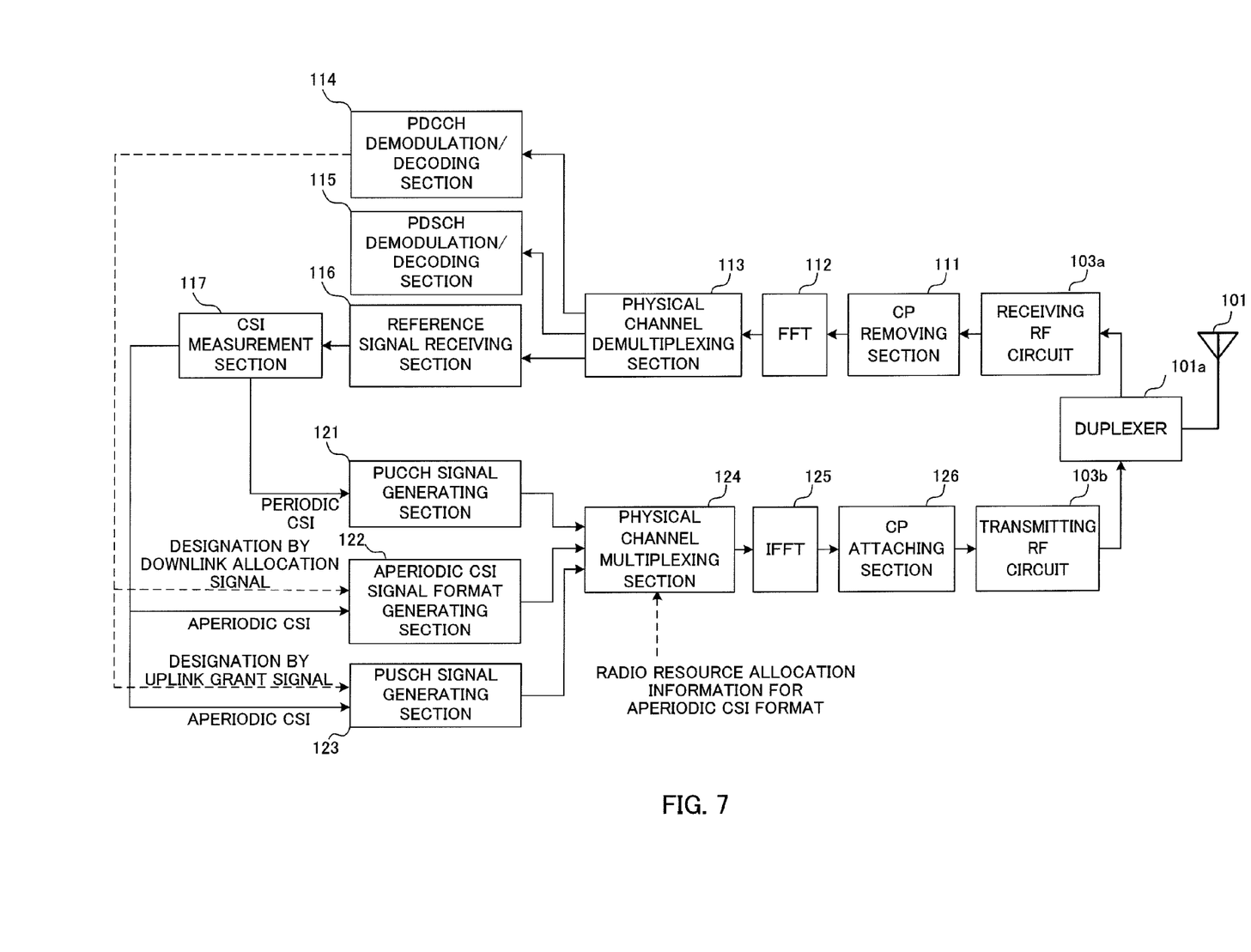
FIG. 7 is a schematic diagram to show an example of a detailed configuration of a user terminal according to the present embodiment.

Now, a detailed configuration of the baseband signal process section 204 of the user terminal 10 will be described with reference to FIG. 7.

A downlink signal that is transmitted from the radio base station apparatus 20 is received in the transmitting/receiving antenna 101. The received downlink signal is converted into a baseband signal in a receiving RF circuit 103a (which corresponds to the transmitting/receiving section 103 and the amplifying section 102 of FIG. 6).

The CP removing section 111 removes cyclic prefixes from the baseband signal. The fast Fourier transform section 112 performs a Fourier transform of the received downlink signal, from which the cyclic prefixes have been removed, converts the received downlink signal into a frequency domain signal, and outputs the frequency domain signal to the physical channel demultiplexing section 113.

The physical channel demultiplexing section 113 demultiplexes the PDCCH, the PDSCH, the CRS, the DM-RS, and the CSI-RS that are multiplexed on the received downlink signal. The demultiplexed physical downlink control channel signal (PDCCH) is output to the PDCCH demodulation/decoding section 114. The demultiplexed physical downlink shared data channel signal (PDSCH) is output to the PDSCH demodulation/decoding section 115. The demultiplexed downlink reference signals (the CRS, the DM-RS, the CSI-RS, etc.) are output to the reference signal receiving section 116.

The PDCCH demodulation/decoding section 114 demodulates and decodes the physical downlink control channel signal (PDCCH). The physical downlink control channel signal includes downlink control information (a downlink allocation signal or an uplink grant signal). Whether or not aperiodic CSI is necessary is determined based on whether the report request bit (CSI request/CQI request) included in the downlink allocation signal or the uplink grant signal is enabled or disabled. The PDSCH demodulation/decoding section 115 demodulates and decodes the downlink shared data channel signal (PDSCH). The decoded downlink shared data is transmitted to the application section 105. The reference signal receiving section 116 outputs the received CSI-RS to the CSI measurement section 17.

The CSI measurement section 117 measures the CQI, which serves as channel information based on the CSI-RS received in the reference signal receiving section 116 described above, and also determines the PMI and RI. The CSI-RS is received periodically, and, every time a CSI-RS is received, the CSI (the CQI, the PMI and the RI) is updated. The CSI measurement section 117 sends the CSI (periodic CSI), measured in a predetermined cycle, to the PUCCH signal generating section 121. When the first aperiodic CSI is triggered by a downlink allocation signal, the CSI measurement section 117 sends the newest measured CSI (aperiodic CSI) to the aperiodic CSI signal format generating section 122. Also, when the second aperiodic CSI is triggered by an uplink grant signal, the CSI measurement section 117 sends the newest measured CSI (second aperiodic CSI) to the PUSCH signal generating section 123.

The PUCCH signal generating section 121 generates the uplink control channel signals to be transmitted by the PUCCH such as periodic CSI, ACK/NACK and so on, and sends these signals to the physical channel multiplexing section 124. When the first aperiodic CSI is triggered by a downlink allocation signal, the aperiodic CSI signal format generating section 122 takes in the newest CSI (the first aperiodic CSI) from the CSI measurement section 117, generates an aperiodic CSI format and sends this to the physical channel multiplexing section 124. The PUSCH signal generating section 123 generates uplink data channel signals such as transmission data from the application section 105, higher control information and so on, and sends these to the physical channel multiplexing section 124. Also, when the second aperiodic CSI is triggered by an uplink grant signal, the PUSCH signal generating section 123 takes in the newest CSI (the second aperiodic CSI) from the CSI measurement section 117, generates second aperiodic CSI, and sends this to the physical channel multiplexing section 124.

The physical channel multiplexing section 124 multiplexes the physical channel signals sent from the PUCCH signal generating section 121, the aperiodic CSI signal format generating section 122, and the PUSCH signal generating section 123. The first aperiodic CSI (aperiodic CSI format) given from the aperiodic CSI signal format generating section 122 is multiplexed on the radio resource (reserved radio resource) reserved in advance. The reserved radio resource is allocated based on the radio resource allocation information for the first aperiodic CSI, given by higher layer signaling in advance. Also, given that the allocation resource for the periodic CSI is the PUCCH and the allocation resource for the second aperiodic CSI is the PUSCH, even at the same transmission timing, there is no collision in the physical channel multiplexing section 124. However, depending on resource allocation, the allocation resource for the first aperiodic CSI may be the PUCCH or the PDSCH. Consequently, there is a possibility that the allocation resource for the first aperiodic CSI collides with the periodic CSI or the second periodic CSI. In this case, the CSI to allocate preferentially is selected according to the priorities determined in advance. The priorities are given, for example, in the order of the second aperiodic CS that is triggered by the uplink grant, the first aperiodic CSI (aperiodic CSI format) that is triggered by downlink allocation, and the periodic CSI that is transmitted periodically. After that, uplink signal including the periodic/aperiodic CSI is converted into a time domain signal in the inverse fast Fourier transform section 125, added cyclic prefixes in the CP attaching section 126 and transmitted from the transmitting/receiving antenna 101 via the transmitting RF circuit 103b.

Next, the radio resource for the first aperiodic CSI will be described.

First, a case will be described where, in the uplink, a single radio resource is secured for one subframe will be described. The reference signal generating section 213 of the radio base station 20 generates downlink reference signals (the CSI-RS, the CRS, and the DM-RS), and these downlink reference signals are allocated to predetermined radio resources for every subframe or for every several subframes, multiplexed on downlink signals and transmitted. The user terminal 10 receives the CSI-RS periodically. The CSI-RS measurement section 117 measures the CQI based on the received CSI-RS, determines the PMI and the RI, and generates channel information.

The scheduler 205 of the radio base station 20 allocates the radio resource for first aperiodic CSI transmission to the uplink on a semi-static basis. To be more specific, the scheduler 205 generates radio resource allocation information for first aperiodic CSI transmission and sends this to the PDSCH signal generating section 212. The PDSCH signal generating section 212 generates PDSCH information including the radio resource allocation information for first aperiodic CSI transmission and transmits this to the user terminal 10. In the user terminal 10, when the radio resource allocation information for first aperiodic CSI transmission is included in the shared data channel of the downlink signal demodulated and decoded in the PDSCH demodulation/decoding section 115, the radio resource allocation information for first aperiodic CSI transmission is given to the physical channel multiplexing section 214. The physical channel multiplexing section 214 secures the radio resource for the first aperiodic CSI (aperiodic CSI format) on the uplink, from the radio resource allocation information for first aperiodic CSI transmission given by RRC signaling.

Figure 8:
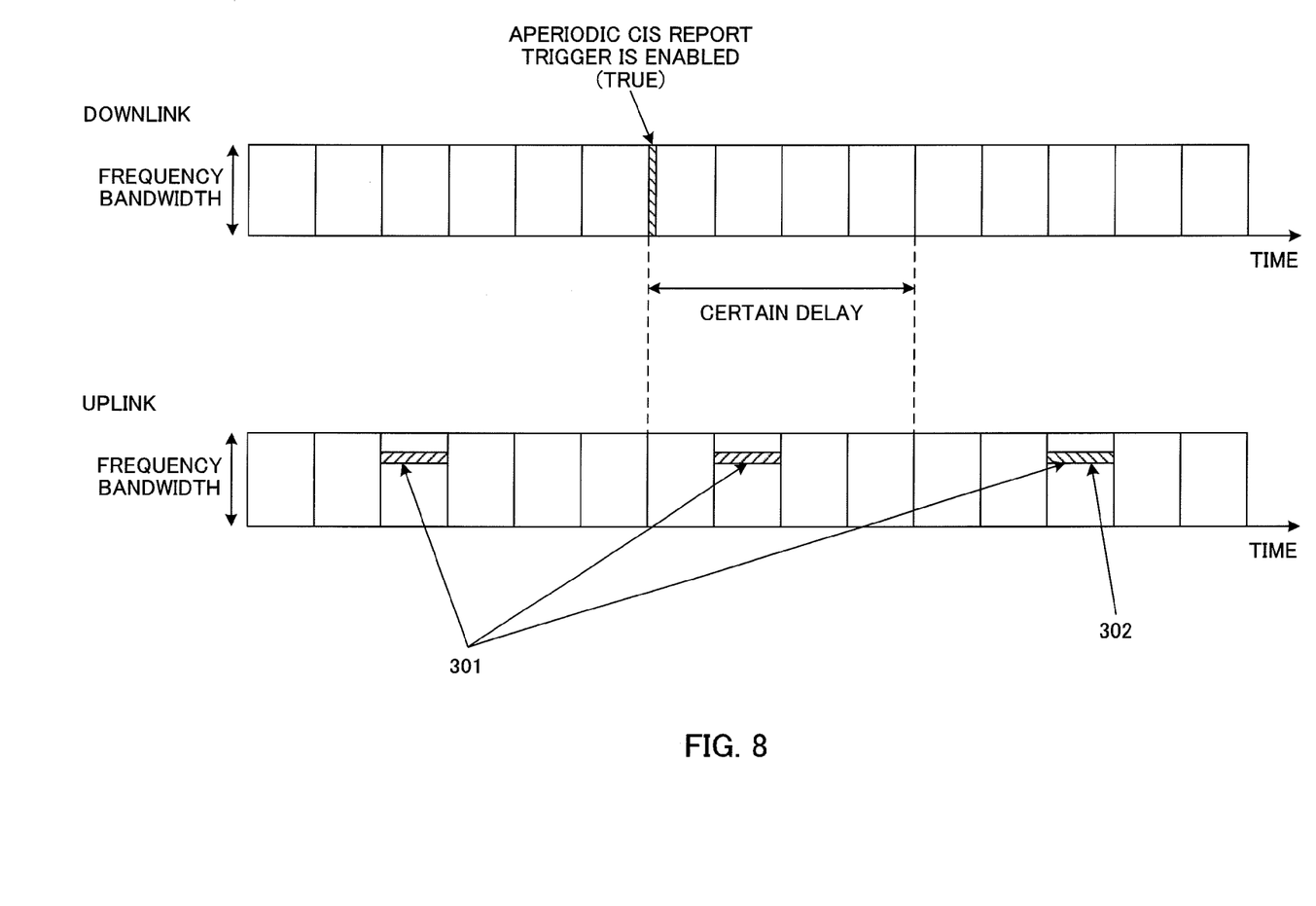
FIG. 8 is a diagram to show a case of reserving a single radio resource.

When a CSI report from the user terminal becomes necessary at arbitrary timing, the scheduler 205 of the radio base station 20 triggers aperiodic CSI by a downlink allocation signal or an uplink grant signal. FIG. 8 is a conceptual diagram in which the first aperiodic CSI is triggered using a downlink allocation signal. When triggering the first aperiodic CSI using a downlink allocation signal, as shown in FIG. 4, the scheduler 205 enables the report request bit, which requests the first aperiodic CSI report, in the CSI request field in the DCI format, which serves as the downlink allocation signal. For example, the report request bit "1" means that the CSI report trigger is enabled ("true"), and the report request bit "0" means that the CSI report trigger is disabled. The PDCCH signal generating section 211 generates downlink control information (DCI), which includes the report request bit, and transmits this by the PDCCH (see FIG. 8).

The user terminal 10 receives the downlink control signal (PDCCH) including the report request bit, and demodulates and decodes the downlink control signal (PDCCH) in the PDCCH demodulation/decoding section 115. When the report request bit is enabled ("true"), the aperiodic CSI signal format generating section 122 takes in the newest CSI (the first aperiodic CSI) from the CSI measurement section 117 and generates CSI (aperiodic CSI format) aperiodically. At this time, the physical channel multiplexing section 214 of the user terminal 10 allocates the first aperiodic CSI to the resource secured for first aperiodic CSI transmission.

To be more specific, when the first aperiodic CSI is triggered in a predetermined subframe on the downlink, the user terminal 10 transmits the first aperiodic CSI using the radio resource 301 that arrives first after the predetermined subframe. In FIG. 8, the first aperiodic CSI is triggered in the n-th subframe, and the first aperiodic CSI is transmitted using the allocated radio resource 302 that arrives first after the (n+4)-th subframe, which is four subframes later.

Figure 9:
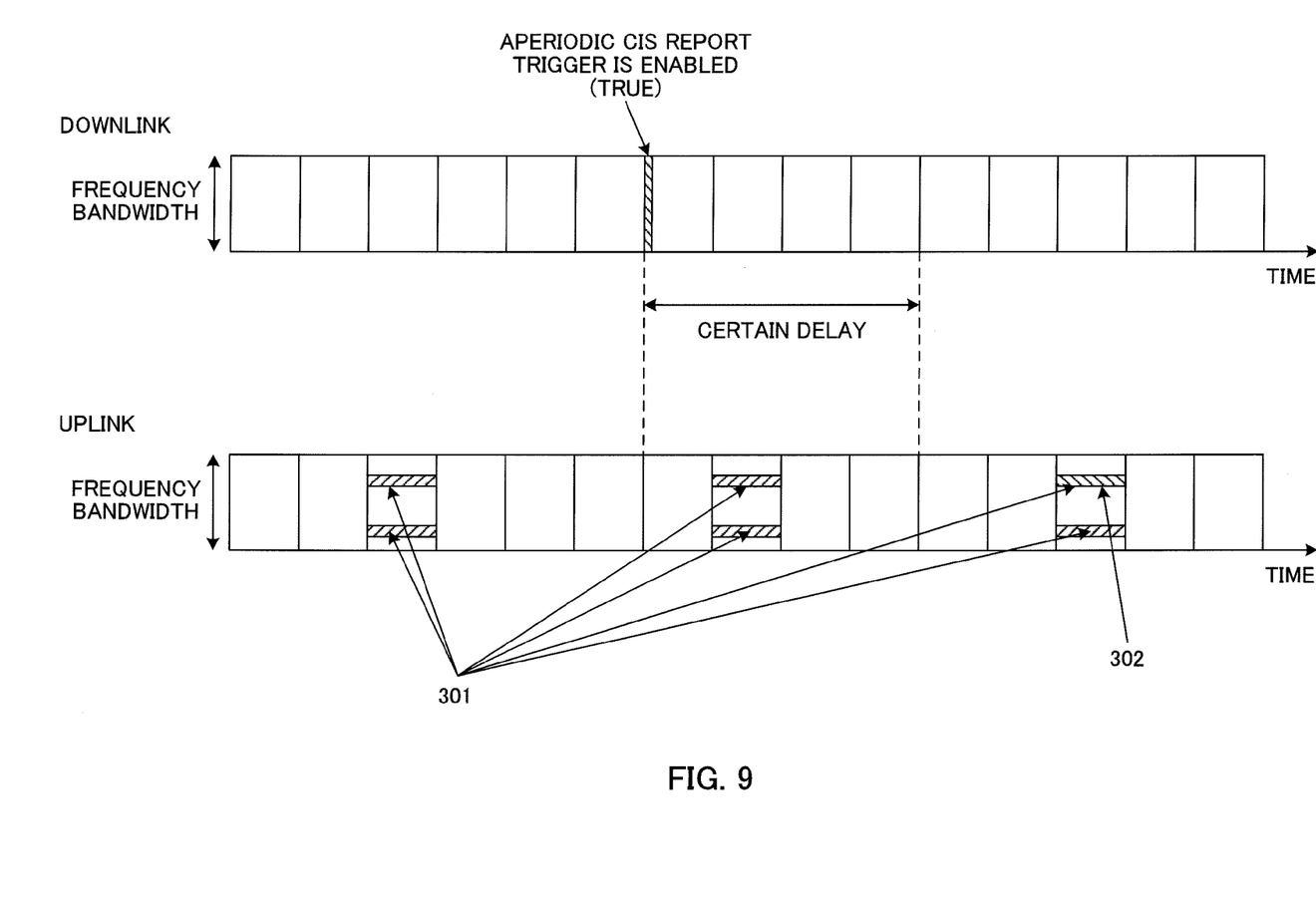
FIG. 9 is a diagram to show a case of reserving a plurality of radio resources.

Next, a case will be described where a plurality of radio resources are reserved for first aperiodic CSI transmission in one subframe. When reserving a plurality of radio resources, the scheduler 205 of the radio base station 20 secures varying radio resources in one subframe as resources for first aperiodic CSI transmission, on the uplink. Resource allocation information for a plurality of secured radio resources is generated, and sent to the PDSCH signal generating section 212.

The user terminal 10 is reported resource allocation information, which represents that a plurality of radio resources are reserved in one subframe, through higher layer signaling. In response to the resource allocation information for a plurality of radio resources, the user terminal 10 reserves a plurality of radio resources (reserved radio resources 301) for first aperiodic CSI transmission, on the uplink, as shown in FIG. 9.

When triggering the first aperiodic CSI using a downlink allocation signal, the scheduler 205 enables the report request bit ("true"), which requests aperiodic CSI in the DCI format of the downlink allocation signal, as shown in FIG. 4. At this time, a plurality of bits are used as report request bits. Then, one of the plurality of radio resources that are reserved for first aperiodic CSI transmission is indicated to the user terminal 10 using the report request bits. By this means, the flexibility of radio resource allocation for first aperiodic CSI transmission improves.

Upon receiving the downlink allocation signal including the report request bits for the first aperiodic CSI, the user terminal 10 demodulates and decodes the report request bit of the first aperiodic CSI in the PDCCH demodulation/decoding section 115. When the report request bit for the first aperiodic CSI by the downlink allocation signal is enabled ("true"), the aperiodic CSI signal format generating section 122 generates the first aperiodic CSI. At this time, when a plurality of radio resources are reserved, the physical channel multiplexing section 214 selects the radio resource 302 designated by the report request bit and allocates the first aperiodic CSI.

In this way, by reserving a plurality of radio resources in one subframe in advance, it is possible to improve the flexibility when allocating the first aperiodic CSI to uplink radio resources. Consequently, it is possible to avoid collision with existing physical channels or other users.

Figure 10:
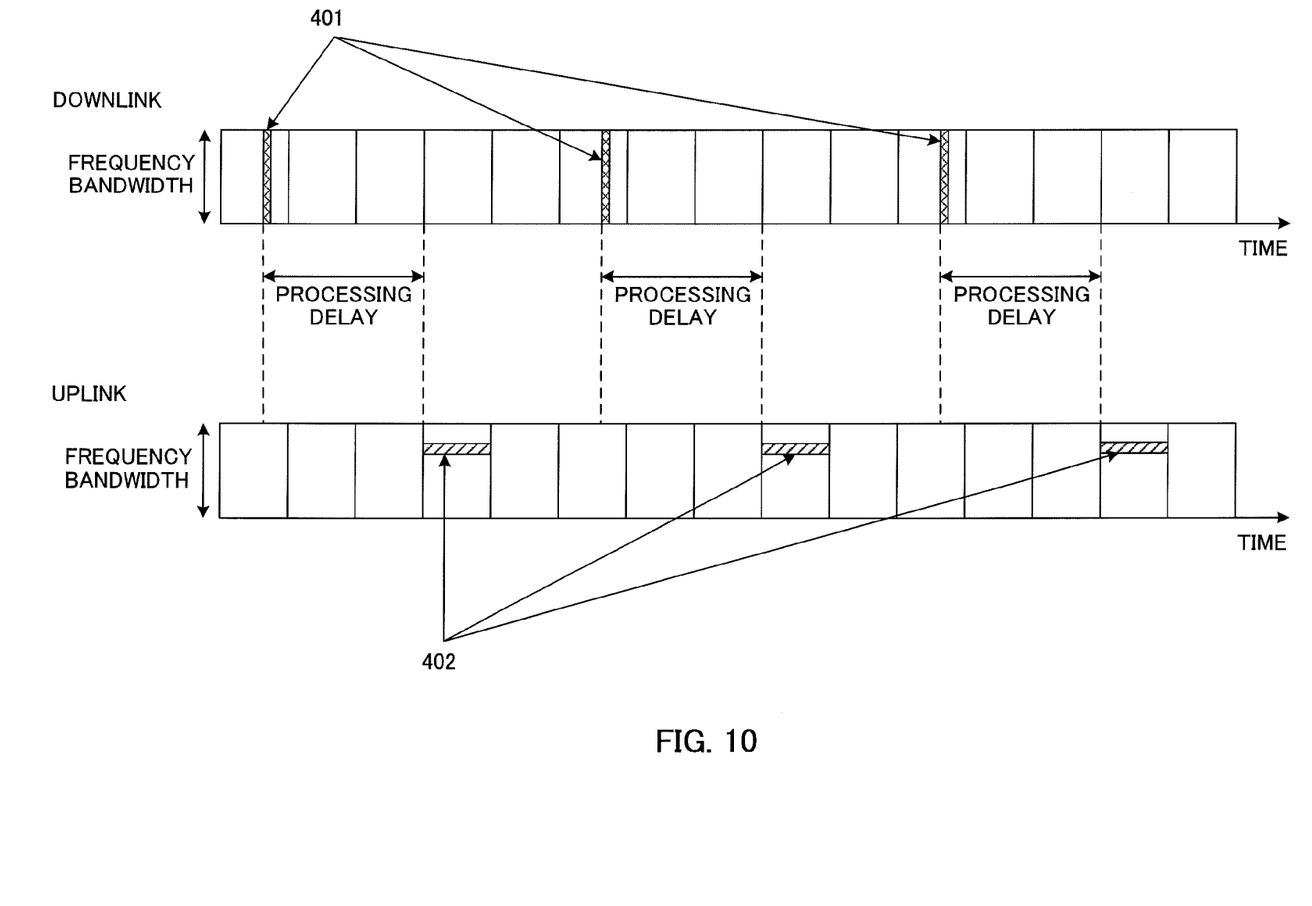
FIG. 10 is a schematic diagram to show the relationship between downlink CSI-RS transmission timing and the first aperiodic CSI transmission timing (reserved radio resources) on the uplink.

FIG. 10 is a schematic diagram showing the relationship between the downlink CSI-RS transmission timing and the first aperiodic CSI transmission timing (reserved radio resources) on the uplink. As shown in FIG. 10, after the radio base station 20 transmits a CSI-RS in the CSI-RS transmission timing 401, there is a predetermined processing delay until the user terminal 10 is able to transmit the first aperiodic CSI. Consequently, even when radio resources are reserved in a shorter cycle than the CSI-RS transmission cycle, it is not possible to return a CSI report, which references the CSI-RS reception result.

Then, as shown in FIG. 10, it is effective to allocate radio resources for the first aperiodic CSI such that the cycle of CSI-RS transmission timings 401 and the cycle of reserved radio resources 402 match. Also, as shown in FIG. 10, it is preferable to set the reserved radio resources 402 at timings delayed by the processing delay with respect to the CSI-RS transmission timings 401. By this means, it is possible to minimize the delay required until the radio base station 20 receives aperiodic CSI reports.

Although a system that can transmit three types of CSI, namely the periodic CSI, the first aperiodic CSI and the second aperiodic CSI, has been described in the above description, it is equally possible to feed back only the periodic CSI and the first aperiodic CSI.

The present invention is not limited to the above embodiment and can be implemented in various modifications. For example, the relationships of connections and functions of the components in the above embodiment can be implemented with various changes. Also, the configurations shown in the above embodiment can be implemented in various adequate combinations. In addition, the present invention can be implemented in various modifications without departing from the spirit of the present invention.

The disclosure of Japanese Patent Application No. 2011-033578, filed on Feb. 18, 2011, including the specification, drawings and abstract, is incorporated herein by reference in its entirety.

The invention claimed is:

1. A radio base station apparatus comprising:
   a downlink control information generating section configured to generate a downlink allocation signal for receiving and decoding downlink transmission data, the downlink allocation signal including a report request bit for triggering reporting of channel information aperiodically;
   a transmission section configured to transmit a downlink signal including a downlink control channel where the downlink allocation signal is mapped;
   a receiving section configured to receive an uplink signal including the reporting of channel information, from a terminal triggered by the report request bit, via an uplink; and
   a control section that allocates reserved radio resources for the reporting of channel information semi-statically to the uplink,
   wherein, when a reserved radio resource is newly allocated, the transmission section transmits higher control information for designating the reserved radio resource on a downlink data channel.

2. The radio base station apparatus according to claim 1, wherein the control section allocates a plurality of reserved radio resources for a signal for the reporting of channel information, in one subframe, which serves as a transmission time interval.

3. The radio base station apparatus according to claim 1, wherein, to minimize a delay time after a reference signal for quality measurement is transmitted on a downlink, until the terminal transmits the reporting of channel information by the reserved radio resources, the control section makes a cycle of the reference signal for quality measurement and a cycle of the reserved resources match.

4. The radio base station apparatus according to claim 1, wherein the downlink control information generating section generates an uplink grant signal for uplink transmission and includes the report request bit for triggering the reporting of channel information aperiodically in the uplink grant signal.

5. A user terminal comprising:
   a receiving section configured to receive a downlink signal;
   a channel information generating section configured to generate channel information based on a reference signal for quality measurement, included in the received downlink signal;
   a downlink control channel demodulation section configured to demodulate a downlink control channel from the received downlink signal, and demodulates a downlink allocation signal including a report request bit for triggering reporting of channel information aperiodically;
   a transmission section configured to transmit an uplink signal including the reporting of channel information triggered by the report request bit included in the demodulated downlink allocation signal; and
   a downlink data channel demodulation section configured to demodulate a downlink data channel from the received downlink signal and acquire higher control information which designates a reserved radio resource allocated to the uplink for the reporting of channel information; and
   a channel multiplexing section configured to identify the reserved radio resource for the reporting of channel information designated by the acquired higher control information, and allocate the reporting of channel information triggered aperiodically by the report request bit, to the reserved radio resource.

6. The terminal according to claim 5, wherein the channel multiplexing section identifies a plurality of radio resources designated by the higher control information and allocates the reporting of channel information to at least one of the plurality of reserved radio resources.

7. The terminal according to claim 5, wherein, a cycle of the reserved radio resources is set such that a delay time after the reference signal for quality measurement is transmitted on the downlink, until the reporting of channel information is transmitted by the reserved radio resources is minimized.

8. The terminal according to claim 5, wherein:
the downlink control channel demodulation section demodulates the downlink control channel from the received downlink signal, and demodulates an uplink grant signal for uplink transmission, including the report request bit for triggering the reporting of channel information aperiodically; and
the transmission section transmits the uplink signal including the reporting of channel information triggered by the report request bit included in the demodulated uplink grant signal.

9. A radio communication method comprising the steps of:
generating a downlink allocation signal for receiving and decoding downlink transmission data, the downlink allocation signal including a report request bit for triggering reporting of channel information aperiodically;
transmitting a downlink signal including a downlink control channel where the downlink allocation signal is mapped;
receiving an uplink signal including the reporting of channel information, from a terminal triggered by the report request bit, via an uplink; and
allocating reserved radio resources for the reporting of channel information semi-statically to the uplink,
wherein, when a reserved radio resource is newly allocated, transmitting higher control information for designating the reserved radio resource on a downlink data channel.

10. A radio communication method comprising the steps of:
receiving a downlink signal;
generating channel information based on a reference signal for quality measurement, included in the received downlink signal;
demodulating a downlink control channel from the received downlink signal, and demodulates a downlink allocation signal including a report request bit for triggering reporting of channel information aperiodically;
transmitting an uplink signal including the reporting of channel information triggered by the report request bit included in the demodulated downlink allocation signal; and
demodulating a downlink data channel from the received downlink signal and acquiring higher control information which designates a reserved radio resource allocated to the uplink for the reporting of channel information; and
identifying the reserved radio resource for the reporting of channel information designated by the acquired higher control information, and allocating the reporting of channel information triggered aperiodically by the report request bit, to the reserved radio resource.

* * * * *